United States Patent
Kandar-Kallen et al.

(10) Patent No.: US 7,044,661 B2
(45) Date of Patent: May 16, 2006

(54) PACKAGING FOR OPTICAL COMPONENT

(75) Inventors: Michael A. Kandar-Kallen, Harrisburg, PA (US); John Rowlette, Fremont, CA (US); Richard Buterbaugh, Middletown, PA (US); Robert Fair, York, PA (US); Randall Paul, Elizabethville, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/470,328

(22) PCT Filed: Jan. 29, 2002

(86) PCT No.: PCT/US02/02502

§ 371 (c)(1),
(2), (4) Date: Mar. 1, 2004

(87) PCT Pub. No.: WO02/061478

PCT Pub. Date: Aug. 8, 2002

(65) Prior Publication Data

US 2004/0136664 A1     Jul. 15, 2004

Related U.S. Application Data

(60) Provisional application No. 60/264,959, filed on Jan. 29, 2001.

(51) Int. Cl.
*G02B 6/255* (2006.01)
*G02B 6/44* (2006.01)
*G02B 6/00* (2006.01)

(52) U.S. Cl. .......................... 385/94; 385/100; 385/147

(58) Field of Classification Search ............ 385/82–94, 385/147, 100; 372/92, 98, 10, 34, 6; 34/523; 345/173; 313/512; 356/437; 422/84
See application file for complete search history.

(56) References Cited

U.S. PATENT DOCUMENTS 6,025,276 A * 2/2000 Donohoe et al. ........... 438/734
6,026,109 A * 2/2000 Micke et al. ................. 372/92

FOREIGN PATENT DOCUMENTS

JP              62287217        * 12/1984

* cited by examiner

*Primary Examiner*—Akm Enayet Ullah

(57) ABSTRACT

An optical package (40) suitable for use in a moist environment, the assembly comprising: (a) an optical component (41); (b) a housing (42) defining at least a main compartment containing the optic al component (41) and at least one access route along which ambient moisture must travel to reach the optical component (41); and (c) a desiccant material (50) disposed along the access route such that moisture entering the housing (42) contacts the desiccant material (50) before reaching the optical component (41).

20 Claims, 2 Drawing Sheets

PACKAGING FOR OPTICAL COMPONENT

CROSS-REFERENCE TO RELATED APPLICATIONS

This application is a U.S. national stage application based on International Application No. PCT/US02/01688, filed Jan. 29, 2002, which claims priority benefit under 35 U.S.C. § 119(e) to U.S. Provisional Application No. 60/262,307, filed Jan. 29, 2001, the disclosures of which are incorporated herein by reference.

FIELD OF INVENTION

This invention relates generally to optical component packages and, more particularly, to optical component packages that are suitable for moist environments.

BACKGROUND OF INVENTION

Recent trends show a dramatic increase in the applications of optical fiber and optical components. These new applications have placed demands not only on the optical components and their performance, but also on the packaging of these components. Today's optical packages need to be robust and suitable for a wide range of environments. Of particular interest herein are optical packages for use in high-moisture applications such as those found outdoors, in industrial plants and machinery rooms, underground or underwater.

One approach for packaging an optical component, such as a channel splitter, involves placing the component in a tube and then sealing the tube on each end with an end cap. More specifically, with reference to FIG. 1, this package 10 is assembled by applying adhesive to the perimeter of the end cap 14 (typically while rotating using a hand-operated fixture) and to the orifice in the end cap through which the fiber 15 (or wire) passes. As used herein, the term "adhesive" refers broadly to both adhesives and sealants. Next, the end cap is pushed into the tube 12. Typically, both end caps are pushed into place simultaneously. The adhesive 13 is then cured while the tube is laying on its side.

This packaging configuration is advantageous in that the end cap 14 is exposed to ambient conditions rather than the adhesive 13. Minimizing the adhesives' exposure to the environment is important since it is typically through the adhesive that moisture enters the housing and damages the optical component.

Despite the advantageous of this approach, the applicants have identified a number of problems with it. First, as shown in FIG. 1, since the epoxy 13 is typically cured while the tube 12 is on its side, an asymmetric distribution of adhesive results. This is especially problematic since it is difficult to control the application of adhesive around the perimeter of the end cap 14 in the first place, thus, often too much adhesive is applied. If too much adhesive is applied, it may interfere with the delicate internal optical component 11, especially given the asymmetric distribution of adhesive. Furthermore, the volume of adhesive may be so large that it imposes expansion/contraction stresses on the packaging during thermal cycling. The uncontrolled distribution of adhesive also increases the possibility of leaving voids in the seal. Aside from problems controlling the adhesive, the adhesive itself may hold moisture which can escape into the housing after packaging and thereby cause the humidity level inside the housing to rise, perhaps to the detriment of the optical component.

Given these difficulties, the applicants have developed an approach for controlling the application of adhesive to the optical package 20 by partitioning the tube 22, preferably with a washer 24, to separate the adhesive 23 from the optical component 21 as shown in FIG. 2. In manufacturing an optical package 20 according to this approach, the tube 22 is held vertically and a washer 24 is placed against a ridge 25 on the inside of the tube 22. Next, the adhesive 23 is applied to the partition formed by the washer 24 and tube 22, and cured. The assembly 20 is then flipped so that the other end is up, and the procedure is repeated.

This approach offers a number of advantages over the prior art approach. First, the sealant partition confines the adhesive and prevents it from flowing into or otherwise interfering with the optical component. Furthermore, since the adhesive is applied to the washer when the tube is vertical and unobstructed with an end cap, it is easy to control the placement and volume of the adhesive. Consequently, the adhesive can be directed precisely to fill around the fiber, minimizing the risk of leaving voids which might transmit moisture. Furthermore, unlike the prior art approach, no skill is required to fill the adhesive into the end cap region and minimal fixturing is required.

The partition also facilitates "pre-sealing." In pre-sealing, the gaps around the partition are filled with a quick-cure adhesive which cures before it has a chance to flow into the main compartment housing the optical component and potentially interfere with the optical component. Once the gaps are filled, more liberal quantities of an additional adhesive may be applied to properly seal the housing. The cure time and dispersion of the additional adhesive are not critical since there is no risk of it entering the main compartment and interfering with the optical component. Thus, the additional adhesive may be selected based on more desirable properties such as resistance to water or other ambient conditions.

Unfortunately, this approach leaves a great deal of adhesive exposed to the environment. Exposing adhesives to a moist environment is generally undesirable because moisture tends to permeate the adhesive over time and eventually enter the main compartment where it can damage the sensitive optical component. Furthermore, it is likely that the adhesive will undergo some degradation due to either ambient moisture or other ambient condition (e.g., ultraviolet radiation, abrasion, caustic substances, etc.).

In light of this shortcoming, the applicants have developed yet another approach which eliminates the adhesive's exposure to the environment. More specifically, with respect to FIG. 3, rather than just partitioning the adhesive from the optical component, the housing 31 defines a separate sealant compartment 33 which is isolated from both the optical component 31 and the environment. In manufacturing this package, a tube 32 is held vertically and a washer 38 is placed against a ridge 39 on the inside of the tube 32. An ultraviolet (UV)-curing adhesive 34 is used to seal the edge of the washer and around the fiber 36. Next, an additional adhesive 37 is applied on top of the washer and around the end cap 35, and the end cap 35 is put in place and cured. It is expected that adhesive flows out of the end cap around its perimeter and along the fiber. The UV adhesive, however, keeps the adhesive from flowing into the compartment containing the optical component 31. Note that the end cap 35 should have the correct fit around its perimeter and through the fiber hole such that adhesive will flow through. Adhesive in these locations provides a longer path through which moisture must diffuse. Once the adhesive is cured, the device is then flipped so that the other end is presented up, and the procedure is repeated.

Pre-sealing the washer offers a number of advantages aside from keeping the end cap adhesive from entering the chamber as mentioned above. Specifically, if the washer is not pre-sealed, it is necessary to use an adhesive of a certain viscosity which is thick enough not to flow through the hole in the washer, but which is thin enough to flow around all components that are to be bonded. The choice of adhesive is complicated by the fact that adhesives tend to flow more easily when they are heated which is often required for curing epoxies. Furthermore, when the tube is sealed, air is trapped inside the tube. If the tube is heated or cooled before the end cap adhesive has cured, the pressure inside the tube changes, forcing air out of or into the tube through the uncured adhesive. This can result in a permanent leak path once the end cap adhesive has cured. Pre-sealing avoids these complications. Pre-sealing also protects the internal components from any vapor which might be released during the cure of the end cap adhesive. The features of pre-sealing allow a wider variety of adhesives to be used for the final end cap sealing.

The advent of the sealant compartment offers a number of significant advantages. In addition to the advantages of the partition approach mentioned above, the sealant compartment approach also minimizes the area of adhesive that is exposed to the environment. As mentioned above this is important since moisture typically passes through adhesives over time and tends to degrade the adhesive.

Despite these advantages, however, under extreme moisture conditions, the risk remains that the adhesive barrier will be breached and moisture will enter the tube. Therefore, if the optical component contained in the tube is particularly susceptible to moisture and the environment is particularly moist, this approach may be insufficient.

Therefore, a need remains for a packaging approach that provides a high level of moisture protection for moisture-sensitive optical components, even at extreme conditions. The present invention fulfills this need among others.

SUMMARY OF INVENTION

The present invention provides for an optical package which uses a desiccant to absorb or otherwise nullify any moisture that enters the housing of the package. Thus, rather than attempting to design and manufacture a perfectly hermetically-sealed package, which becomes exponentially more difficult to achieve as the tolerance for moisture decreases, the package of the present invention needs to be only reasonably moisture-proof given its relatively high tolerance for moisture. This relaxes the manufacture and design needs of the package of the present invention and facilitates the use of relatively inexpensive materials and conventional manufacturing techniques. Therefore, the present invention exploits the observation that it is far easier to remove any moisture that might pass through the housing of an optical package, than it is to prevent the moisture from entering in the first place.

One aspect of the invention is an optical package comprising a desiccant. In a preferred embodiment, the package comprises: (a) an optical component; (b) a housing defining at least main compartment containing the optical component; and (c) a desiccant material disposed in the vicinity of the optical component to remove a substantial portion of any moisture entering the housing. Preferably, the housing comprises at least one access route, along which ambient moisture must travel to reach the optical component. In such a configuration, the desiccant is disposed along the access route such that moisture entering the housing contacts the desiccant material before reaching the optical component Another aspect of the invention is a process of manufacturing the optical package by partitioning the desiccant and adhesive. In a preferred embodiment, the process comprises: (a) positioning an optical component in a main compartment of a housing; (b) placing a desiccant in the housing such that ambient moisture that enters the housing contacts the desiccant before reaching the optical component; (c) pre-sealing the housing to establish a partition to prevent an adhesive used for sealing the housing from entering the main compartment; and (d) sealing the housing to prevent substantially moisture from entering the housing.

DETAILED DESCRIPTION OF PREFERRED EMBODIMENT

Figure 1:
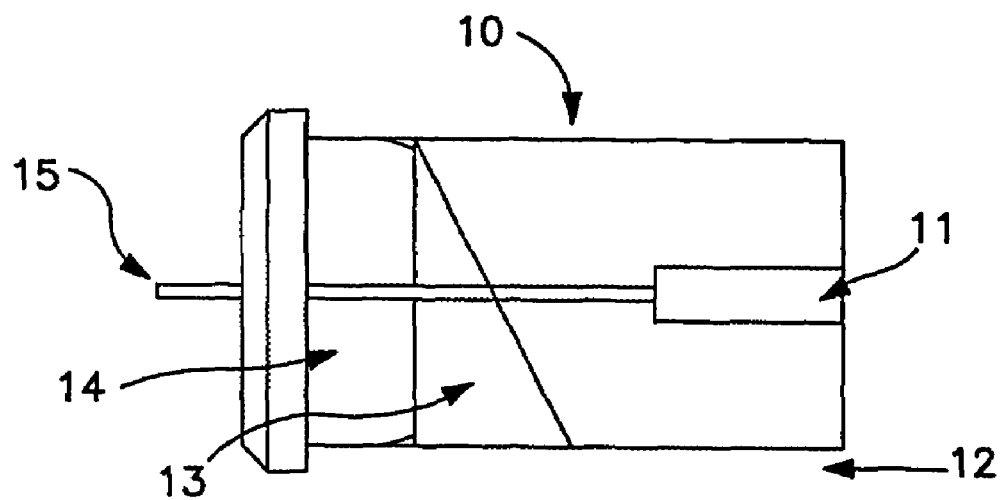
FIG. 1 illustrates the applicants' concern with the prior art method of packaging optical components.
Figure 2:
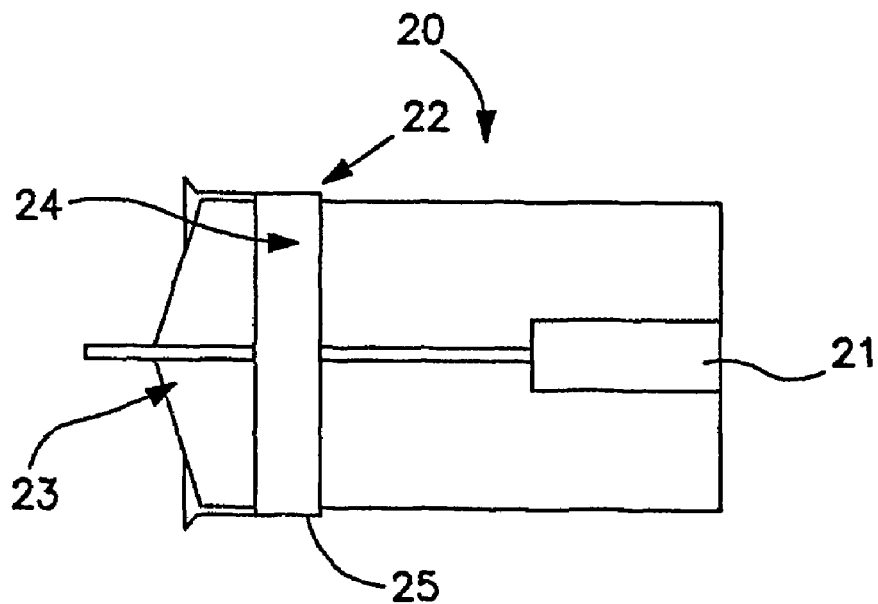
FIG. 2 shows an improved approach for packaging optical components in which the adhesive is partitioned from the optical component.
Figure 3:
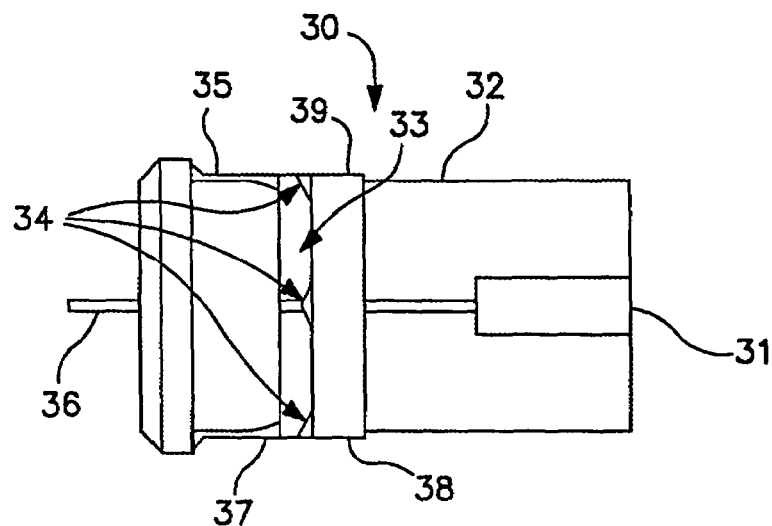
FIG. 3 shows another improved packaging approach which utilizes a separate sealant compartment for isolating the adhesive from both the ambient environment and the optical component.
Figure 4:
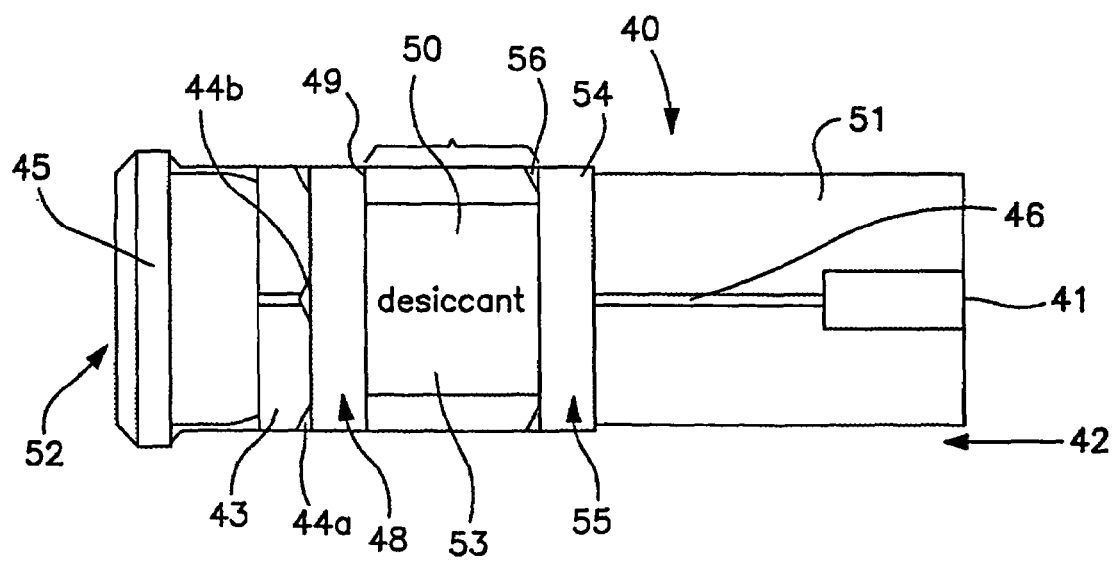
FIG. 4 depicts the packaging approach of the present invention in which a desiccant is used.

Referring to FIG. 4, a preferred embodiment of the packaging system of the present invention is shown. The packaging system 40 is suitable for particularly high humidity or moist conditions. Such conditions can be found in a number of environments such as, for example, outdoors, inside industrial plants and machinery rooms, underground or underwater.

The optical package 40 comprising an optical component 41, a housing 42 defining at least a main compartment 51 containing the optical component 41 and at least one access route 52 from the environment to the main compartment 51. The optical package also comprises a desiccant material 50 disposed along the access route 52 such that ambient moisture entering the housing must pass by the desiccant material 40 to access the optical component 41. The various components of the optical package are discussed below in greater detail.

At the heart of the optical package is the optical component 41. As used herein, the term "optical component" is used broadly to cover purely-optical or optoelectric components used in both passive and active devices. The term "passive devices," as used herein, refers to any optical or optoelectric device that manipulates an optical signal but which does not impart energy into the system. Examples of passive devices include add/drop filters, silica planar waves guides, arrayed wave guide gratings (AWGs), splitters/couplers, and attenuators. As used herein, the term "active device" refers to any optical or optoelectric device that either converts signals between optical and electrical domains or imparts energy into an optical system. Examples of active devices include lasers, photodiodes, and optical amplifiers. The optical component may be part of a larger assembly or it may comprise subcomponents.

Optical components tend to be susceptible to environmental conditions such as humidity and dust. Those optical components having exposed optical paths are especially sensitive to moisture and dust since moisture droplets and dust can interfere with the optical path. For example, a dust particle is approximately the same size as the core of a single mode fiber and, thus, can totally obscure the fiber and ruin the device's performance. Due to the sensitive nature of optical components, it is important to package them to minimize the external threats such as moisture and dust. To this end, the packaging approach of the present invention employs a housing 42 which contains the optical component 41.

The housing 42 can be formed of a variety of materials, however, it is generally preferred that these materials be rigid, water resistant, and readily formable. Additionally, it may be preferable, in some circumstances, to employ an energy-absorbing material in the housing to afford a certain measure of shock resistance. Suitable materials include for example, plastics, metal, and rubbers and combinations thereof. Preferably, the housing is made of a metal due to its ready availability and durable nature. Examples of preferred metals include, for example, stainless steel and aluminum.

The shape and configuration of the housing can vary depending upon the application and the invention is, by no means, restricted to any particular shape. The housing must define a main compartment 51 for containing the optical component and preferably an access route into the main compartment for placing the optical component therein. Although the access route initially provides passage into the main compartment, it should be understood that the access route is eventually sealed from the environment, preferably in a permanent fashion. Therefore, as used herein, the term "access route" refers to the initial state of the housing and that the access route is sealed in the completed package. One should also appreciate that even though the access route is sealed, it nevertheless represents a "weak link" in the housing through which moisture tends to be more likely to enter then through any other point of the housing.

It is generally preferable to minimize access routes and joints in the housing, thereby minimizing the potential sites through which moisture and/or dust can enter the housing and potentially damage the optical component. Accordingly, shapes such as elongated tubes or cans which are integrally formed (seamless) are preferable. For example, as shown in FIG. 4, the housing 42 is an elongated tube having two ends. It should be understood that FIG. 4 only depicts one end and that a similar configuration can be found at the other end of the elongated tube. Although seamless housing structures are preferred, it should be understood that a housing made of various components which are welded or otherwise combined is within the scope of the invention.

The housing of the present invention is partitioned to define different compartments which serve different purposes. As shown in FIG. 4, the package has a main compartment 51, a desiccant compartment 53 adjacent to the main compartment 51, and a sealant compartment 43 between the desiccant compartment 53 and the environment. Each compartment in this configuration serves a different purpose.

The sealant compartment 43 contains the adhesive which serves to seal the housing from the environment to substantially prevent the moisture from entering the housing. The term "substantially" as used in this context is intended to convey that most of ambient moisture is prevented from entering the housing but not necessarily all. It is not critical to the present invention that the housing be sealed to prevent a certain amount of moisture from entering the housing. However, since the desiccant tends to be a consumable resource, its life cycle is likely to be shortened as the amount of moisture that is permitted to enter the housing increases.

The sealant compartment 43 (as described above in the background section) enables one to seal the package without the risk of potentially contaminating or otherwise interfering with the optical component with the adhesive. More specifically, the partition 48, as shown in FIG. 4, may be set in place and then "pre-sealed" with a quick-cure adhesive, such as a UV-curable epoxy. The quick-cure adhesive may be applied to any gaps in the partition such as, for example, the perimeter 44a of the partition 48 or the hole 44b through which a fiber 46 (or wire) passes through the partition 48. By precisely applying the adhesive to these areas and quickly curing it, the risk of the adhesive flowing into the main compartment and potentially damaging the optical component is minimized considerably. Additionally, once the quick-cure adhesive is in place, a barrier to the main compartment 51 is established and it is then possible to apply a more liberal quantity of additional adhesive to secure the end cap 45 in place.

The types of adhesives used can vary and are within the purview of one skilled in the art. For reasons as mentioned above, however, it is generally preferred that, when "pre-sealing" the housing, a quick-cure adhesive be used. Suitable quick-cure adhesives are known in the art and include, for example, UV-activated epoxies, epoxies with fast-acting catalysts, or adhesives which set immediately upon exposure to a certain amount of energy which is readily deliverable in situ. The additional adhesive which is applied to secure the end cap 45 or similar device in place need not be selected based on its cure-rate characteristics since it may be allowed to flow during curing. Rather, the additional adhesive should be selected based on properties more germane to its purpose-namely, to seal the housing and resist the penetration of dust and moisture. To this end, an adhesive is preferred which has strong adhesive properties to hold the end cap or similar structure and which is resistant to water penetration and degradation. Again, such adhesives are known in the art, although epoxies, polyurethanes, and acrylates are preferred, and epoxies are more preferred. Due to pre-sealing, the rate at which the additional adhesive cures is not critical, although for commercial purposes it is preferable that its cure rate be quick enough to achieve reasonable manufacturing throughput.

Referring now the desiccant compartment 53, its function is to hold the desiccant 50 along the access route 52 such that ambient moisture must pass the desiccant to reach the optical component. Additionally, the desiccant compartment also serves to contain the desiccant and separate it from the optical component. This later feature may be critical if the desiccant is particularly dusty (as desiccates tend to be) and if the optical component is particularly susceptible to dust. As mentioned above, optical components which tend to be susceptible to dust are those which have an exposed optical path. It should be understood, however, that if the desiccant used is not particularly dusty or if the optical component is not susceptible to dust, then there need not be a sealed partition between the desiccant and the main compartment. In other words, the desiccant could be situated in the main compartment so as to remove substantially any moisture that enters the housing. Regardless of whether the desiccant is in its own compartment, it is preferable to position the desiccant such that any ambient moisture entering the housing contacts the desiccant before reaching the optical component.

The partitions used to define the sealant, desiccant and main compartments may assume a variety of forms. For example, as shown in FIG. 4, the partition 48 that separates the sealant compartment from the desiccant compartment is a circular washer that seats on a ledge 49 formed by the desiccant 53. The partition 55 that separates the sealant compartment 43 from the main compartment 51 is also a washer that seats on a ridge 54 which is machined or otherwise formed in the interior surface of the elongated tube 42. Each washer has an aperture (not shown) approximately in its middle to allow passage of the fiber 46. As mentioned above, it is generally preferred that the perimeter around the washers and the aperture be sealed with an adhesive. Although this approach for partitioning is preferred from the standpoint of simplicity, availability of components, and ease of manufacture, other approaches are within the scope of the present invention. For example, the partitions may be tack welded in place or the partitions may actually define separate compartments of the housing which are joined (e.g., welded) together to form the completed housing.

To seal the housing closed, an end cap 52 is preferred. As mentioned above, an end cap is preferred since it leaves very little of the adhesive exposed to the environment. It should be understood, however, that other mechanisms may be used to seal the housing such as, for example, a screw top, a lid which is welded or otherwise fastened in place, or a stopper which perhaps is elastically deformable to present an urging force against the housing when in place to effect a friction fit with the housing.

The desiccant used may be any drying agent, including either a chemical desiccant which acts by absorption, for example, by reacting with water (e.g., phosphorous pentoxide) or a physical desiccant which acts by adsorption (e.g., a silica gel). Suitable desiccants include for example, $P_2O_5$, $Mg(ClO_4)_2$, KOH, $H_2SO_4$, NaOH, CaO, $CaCl_2$, $ZnCl_2$, $CuSO_4$ and zeolites, such as $Na_2O \cdot 2Al_2O_3 \cdot 5SiO_2$ and $CaO \cdot 2Al_2O_3 \cdot 5SiO_2$. Preferably, the desiccant is a zeolite. Many desiccants tend to be somewhat brittle and produce dust if subject to shock or vibration. As mentioned above, dust is not tolerable for certain optical components. To avoid the release of dust and thus the need for a separate desiccant compartment, it may be preferred to embed/disperse/suspended the desiccant in a plastic or gel or otherwise covered it in plastic. These desiccant forms tend to be more resilient to the formation of dust and, as mentioned above, the housing may be simplified if such desiccants are used-specifically, the partition separating the desiccant from the optical component may be eliminated.

The shape of the desiccant material may vary within the scope of the invention, although consideration should be given to its exposed surface area since the absorption/adsorption process tends to occur only on the surface. Examples of suitable forms of desiccant include, for example, a packed bed of pellets (or other particularized form of desiccant) or an aggregate of desiccant such as a solid disk. Preferably, the configuration of the desiccant allows for its placement in the housing without the need to thread the desiccant down the length of a fiber or wire. For example, in the case of a packed bed, the pellets may simply be poured around the fiber or wire. In the case of a desiccant aggregate, slotted disks or discrete disk segments may be placed around the fiber or wire. In a preferred embodiment, the desiccant is a C-shaped slotted disk.

The optical package of the present invention as described above lends itself to a readily-commercializable manufacturing process. In the preferred embodiment, the process comprises holding the elongated tube vertically and placing the partition 55, which is preferably a washer, against a ridge 54 on the inside surface of the tube. Next, a UV-curing adhesive is used to provide a seal 56 around the perimeter of the partition 55 and a seal (not shown) around the fiber 46. This partition defines one end of the desiccant compartment 53. Next, the desiccant 50 is placed upon the partition 55 and a second partition 48, which is also preferably a washer, is put in place against a support, which in this embodiment is part of the desiccant structure. Again, a UV-curing adhesive is used to provide a seal 44a around the perimeter of the second partition 48 and a seal 44b around the fiber 46. This second partition serves to further define the desiccant compartment 53 as well as to establish one side of the sealant compartment 43. At this point, adhesive is applied liberally to the top of the second partition 48 and around the end cap 45. The end cap 45 is put in place while allowing the adhesive to flow out of the end cap's perimeter and its fiber hole. As mentioned above, the UV-curable adhesive prevents adhesives from flowing past the partition 48 and into either the main compartment or the desiccant compartment. At this point, the adhesive is cured and the device is flipped so the procedure may be repeated to the other end.

The compartmentalized configuration of the optical package of the present invention lends itself to a high degree of reliability in manufacturing and uses assembly techniques which are readily commercializable in that they can be scaled up and automated. Basically, the packaging begins with the optical component and works its way out one compartment at a time, one end at a time. The use of pre-sealing as mentioned above controls the flow of adhesive and minimizes risk of contaminating the optical component. Furthermore, as mentioned above, since the optical package of the present invention relies on the desiccant interacting with any moisture that may penetrate the housing, the package need not be over engineered to prevent moisture from entering. In other words, rather than designing and constructing a perfectly hermetically sealed package, which becomes exponentially more difficult as the tolerance for moisture decreases, the packaging of the present invention uses relatively simple and known construction techniques with relatively simple and known components to manufacture a reasonably water-tight package and relies on the desiccant to nullify any moisture that may penetrate the housing.

What is claimed is:

1. An optical package suitable for use in a moist environment, said assembly comprising:
    an optical component;
    a housing defining at least a main compartment containing said optical component, and an access route along which ambient moisture must travel to reach said main compartment; and
    a desiccant material disposed in the housing to substantially remove any moisture entering said housing, said desiccant being disposed along said access route such that moisture entering said housing contacts said desiccant material before reaching said main compartment.

2. The optical package of claim 1 wherein said housing is elongated with two ends, said access route extending from at least one of said ends to said main compartment.

3. The optical package of claim 1, wherein said access route is sealed substantially from ambient moisture by an adhesive and said housing defines a partition between the adhesive and the optical component.

4. The optical package of claim 1, wherein said housing comprises a sealant compartment along said access route, said sealant compartment containing said adhesive.

5. The optical package of claim 4, wherein said desiccant is between said main compartment and said sealant compartment.

6. The optical package of claim 5, wherein said desiccant is contained in a desiccant compartment which is partitioned from said main chamber.

7. The optical package of claim 5, wherein said desiccant is not partitioned from said main compartment.

8. The optical package of claim 7, wherein said desiccant is dust-resistant.

9. The optical package of claim 7, wherein said optical component does not have an exposed optical path.

10. The optical package of claim 1, wherein said desiccant is at least one of $P_2O_5$, $Mg(ClO_4)_2$, KOH, $H_2SO_4$, NaOH, CaO, $CaCL_2$, $ZnCl_2$, $CuSO_4$, or zeolites.

11. The optical package of claim 10, wherein said desiccant is zeolite.

12. The optical package of claim 1, wherein said optical component is at least one of add/drop filters, silica planar waves guides, arrayed wave guide gratings (AWGs), splitters/couplers, attenuators, lasers, photodiodes, detectors or optical amplifiers.

13. An optical component package comprising:
   an optical component;
   a housing having at least a main compartment containing said optical component, a sealant compartment through which ambient moisture must pass to reach said optical component, and a desiccant compartment disposed between said sealant compartment and said main compartment,
   an adhesive contained within said sealant compartment, said adhesive substantially preventing ambient moisture from entering said housing; and
   a desiccant contained within said desiccant compartment such that moisture entering said housing contacts said desiccant before reaching said optical component.

14. The optical package of claim 13, wherein said housing comprises an elongated member containing a number of partitions, a first partition separates said main compartment from said desiccant compartment, a second partition separates said desiccant compartment from said sealant compartment and wherein said elongated member has an end cap on one end, thus, said main compartment is on one said of said first partition, said desiccant compartment is between said first and second partitions, and said sealant compartment is between said second partition and said end cap.

15. The optical package of claim 14, wherein said elongated member is a tube and said first and second partitions are washers in said tube.

16. The optical package of claim 15, wherein the interior surface of said tube has ridges upon which at least one washer abuts.

17. A process for manufacturing an optical package, said process comprising:
   positioning an optical component in a main compartment of a housing;
   disposing a desiccant in said housing such that ambient moisture entering said housing contacts said desiccant before reaching said optical component;
   pre-sealing said housing in which a partition is establish to prevent an adhesive used for sealing said housing from entering said main compartment; and
   sealing said housing with said adhesive to prevent substantially moisture from entering said housing.

18. The process of claim 17, further comprising establishing a barrier between said main compartment and said desiccant such that dust from said desiccant cannot enter said main compartment.

19. The process of claim 17, wherein pre-sealing comprises applying a quick-cure adhesive to gaps to prevent said adhesive from passing.

20. The process of claim 19, wherein said adhesive has a lower cure rate than said quick-cure adhesive.

* * * * *

UNITED STATES PATENT AND TRADEMARK OFFICE
CERTIFICATE OF CORRECTION

PATENT NO. : 7,044,661 B2
APPLICATION NO. : 10/470328
DATED : May 16, 2006
INVENTOR(S) : Michael A. Kadar-Kallen et al.

It is certified that error appears in the above-identified patent and that said Letters Patent is hereby corrected as shown below:

Correct spelling of inventor name:

(75) Michael A. Kadar-Kallen

Signed and Sealed this

Eighteenth Day of July, 2006

JON W. DUDAS
*Director of the United States Patent and Trademark Office*